(12) United States Patent
Shaw et al.

(10) Patent No.: US 7,680,389 B2
(45) Date of Patent: Mar. 16, 2010

(54) LIGHT TRANSCEIVER MODULE

(75) Inventors: Cheng-Da Shaw, Hsinchu (TW);
Shun-Tien Lee, Hsinchu (TW);
Chiung-Hung Wang, Hsinchu (TW);
Min Sheng Kao, Hsinchu (TW); Cheng Hung Tsai, Hsinchu (TW); Kun-Yi Shen, Hsinchu (TW); Chia Hung Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 274 days.

(21) Appl. No.: 11/643,893

(22) Filed: Dec. 22, 2006

(65) Prior Publication Data

US 2007/0104427 A1 May 10, 2007

Related U.S. Application Data

(63) Continuation-in-part of application No. 10/949,792, filed on Sep. 24, 2004, now Pat. No. 7,300,215.

(30) Foreign Application Priority Data

Jun. 4, 2004 (TW) ............................ 93116137 A

(51) Int. Cl.
*G02B 6/42* (2006.01)
*H04B 10/02* (2006.01)
(52) U.S. Cl. ................ 385/139; 385/95; 398/139
(58) Field of Classification Search ............... 385/139, 385/192–194, 92; 398/139
See application file for complete search history.

(56) References Cited

U.S. PATENT DOCUMENTS

| 5,479,288 | A | 12/1995 | Ishizuka et al. |
| 5,528,408 | A | 6/1996 | McGinley et al. |
| 5,546,281 | A | 8/1996 | Poplawski et al. |
| 5,717,533 | A | 2/1998 | Poplawski et al. |
| 5,734,558 | A | 3/1998 | Poplawski et al. |
| 5,864,468 | A | 1/1999 | Poplawski et al. |
| 5,879,173 | A | 3/1999 | Poplawski et al. |
| 5,956,168 | A | 9/1999 | Levinson et al. |
| 5,971,628 | A | 10/1999 | Dona et al. |
| 6,075,634 | A | 6/2000 | Casper et al. |
| 6,085,006 | A | 7/2000 | Gaio et al. |
| RE36,820 | E | 8/2000 | McGinley et al. |
| 6,160,647 | A | 12/2000 | Gilliland et al. |
| 6,200,041 | B1 | 3/2001 | Gaio et al. |
| 6,201,704 | B1 | 3/2001 | Poplawski et al. |

(Continued)

FOREIGN PATENT DOCUMENTS

TW 1226468 1/2005

(Continued)

*Primary Examiner*—Jerry T Rahll
(74) *Attorney, Agent, or Firm*—Rabin & Berdo, P.C.

(57) ABSTRACT

A light transceiver module is designed for electronic devices. It forms an electric connection with the electric connector of the electronic device. The light transceiver module contains a base, a light-emitting device for providing optical signals, a light-receiving device for receiving optical signals, and a main circuit board. The base supports the light-emitting device, the light-receiving device, and the main circuit board. The main circuit board has a pluggable electric connector for connections with the electric connector of the electronic device. The light transceiver module can be used to simplify and optimize the devices using it.

18 Claims, 9 Drawing Sheets

U.S. PATENT DOCUMENTS

| | | | |
|---|---|---|---|
| 6,206,582 B1 | 3/2001 | Gilliland | |
| 6,213,651 B1 | 4/2001 | Jiang et al. | |
| 6,220,878 B1 | 4/2001 | Poplawski et al. | |
| 6,234,686 B1 | 5/2001 | Tonai et al. | |
| 6,264,481 B1 | 7/2001 | Kozel et al. | |
| 6,267,606 B1 | 7/2001 | Poplawski et al. | |
| 6,308,235 B1 | 10/2001 | Scharf et al. | |
| 6,324,610 B1 | 11/2001 | Lord et al. | |
| 6,344,969 B1 | 2/2002 | Lord et al. | |
| 6,350,063 B1 | 2/2002 | Gilliland et al. | |
| 6,358,066 B1 | 3/2002 | Gilliland et al. | |
| 6,369,924 B1 | 4/2002 | Scharf et al. | |
| 6,371,663 B1 | 4/2002 | Kneier et al. | |
| 6,430,053 B1 | 8/2002 | Peterson et al. | |
| 6,431,764 B1 | 8/2002 | Scharf et al. | |
| 6,439,781 B1 | 8/2002 | Gaio et al. | |
| 6,439,918 B1 | 8/2002 | Togami et al. | |
| 6,441,937 B1 | 8/2002 | Baur et al. | |
| 6,457,875 B1 | 10/2002 | Kropp et al. | |
| 6,461,058 B1 | 10/2002 | Birch et al. | |
| 6,482,017 B1 | 11/2002 | Van Doorn | |
| 6,483,711 B1 | 11/2002 | Huang | 361/736 |
| 6,485,322 B1 | 11/2002 | Branch et al. | |
| 6,494,623 B1 | 12/2002 | Ahrens et al. | |
| 6,497,588 B1 | 12/2002 | Scharf et al. | |
| 6,499,890 B2 | 12/2002 | Gilliland et al. | |
| 6,502,999 B1 | 1/2003 | Cohen et al. | |
| 6,530,699 B1 | 3/2003 | Gilliland et al. | |
| 6,533,470 B2 | 3/2003 | Ahrens | |
| 6,533,603 B1 | 3/2003 | Togami | |
| 6,540,412 B2 | 4/2003 | Yonemura et al. | |
| 6,540,555 B1 | 4/2003 | Festag et al. | |
| 6,544,055 B1 | 4/2003 | Branch et al. | |
| 6,551,117 B2 | 4/2003 | Poplawski et al. | |
| 6,554,492 B2 | 4/2003 | Gilliland et al. | |
| 6,556,445 B2 | 4/2003 | Medina | |
| 6,558,196 B2 | 5/2003 | Festag | |
| 6,570,768 B2 | 5/2003 | Medina | |
| 6,575,770 B2 | 6/2003 | Birch et al. | |
| 6,599,033 B1 | 7/2003 | Pohnke | |
| 6,600,611 B2 | 7/2003 | Inujima et al. | |
| 6,607,307 B2 | 8/2003 | Gilliland et al. | |
| 6,607,308 B2 | 8/2003 | Dair et al. | |
| 6,609,838 B1 | 8/2003 | Branch et al. | |
| 6,612,525 B2 | 9/2003 | Bagdi | |
| 6,612,858 B1 | 9/2003 | Stockhaus | |
| 6,619,859 B1 | 9/2003 | Minamino et al. | |
| 6,623,179 B2 | 9/2003 | Hurt et al. | |
| 6,632,030 B2 | 10/2003 | Jiang et al. | |
| 6,659,655 B2 | 12/2003 | Dair et al. | |
| 6,661,565 B2 | 12/2003 | Shaw et al. | |
| 6,666,484 B1 | 12/2003 | Branch et al. | |
| 6,672,901 B2 | 1/2004 | Schulz et al. | |
| 6,676,302 B2 | 1/2004 | Cheng et al. | |
| 6,688,779 B2 | 2/2004 | Nishita | |
| 6,692,159 B2 | 2/2004 | Chiu et al. | |
| 6,705,879 B2 | 3/2004 | Engel et al. | |
| 6,713,866 B2 | 3/2004 | Simon et al. | |
| 6,728,098 B1 | 4/2004 | Brostom | |
| 6,729,771 B2 | 5/2004 | Kim et al. | |
| 6,739,760 B2 | 5/2004 | Cheng et al. | |
| 6,744,639 B1 | 6/2004 | Branch et al. | |
| 6,746,158 B2 | 6/2004 | Merrick | 385/53 |
| 6,778,399 B2 | 8/2004 | Medina et al. | |
| 6,780,678 B2 | 8/2004 | Simon et al. | |
| 6,788,540 B2 | 9/2004 | Kruger et al. | |
| 6,789,958 B2 | 9/2004 | Ahrens et al. | |
| 6,796,715 B2 | 9/2004 | Chiu et al. | |
| 6,804,431 B2 | 10/2004 | Kowalkowski et al. | |
| 6,807,065 B2 | 10/2004 | Sato | |
| 6,807,345 B2 | 10/2004 | Simon | |
| 6,808,317 B2 | 10/2004 | Cheng et al. | |
| 6,808,318 B2 | 10/2004 | Cheng et al. | |
| 6,808,319 B2 | 10/2004 | Cheng et al. | |
| 6,808,320 B2 | 10/2004 | Cheng et al. | |
| 6,811,317 B2 | 11/2004 | Chiu et al. | |
| 6,811,326 B2 | 11/2004 | Keeble et al. | |
| 6,811,413 B2 | 11/2004 | Keeble et al. | |
| 6,814,502 B2 | 11/2004 | Chiu et al. | |
| 6,817,886 B2 | 11/2004 | Amorim | |
| 6,822,872 B2 | 11/2004 | Schulz et al. | |
| 6,824,416 B2 | 11/2004 | Di Mascio | |
| 6,832,856 B2 | 12/2004 | Chiu et al. | |
| 6,836,493 B2 | 12/2004 | Mahowald et al. | |
| 6,840,680 B1 | 1/2005 | Chiu et al. | |
| 6,840,686 B2 | 1/2005 | Jiang et al. | |
| 6,846,114 B2 | 1/2005 | Chiu et al. | |
| 6,851,867 B2 | 2/2005 | Pang et al. | |
| 6,854,997 B2 | 2/2005 | Stockhaus | |
| 6,855,558 B1 | 2/2005 | Hattori | 436/160 |
| 6,856,769 B1 | 2/2005 | Steffensen et al. | |
| 6,857,791 B2 | 2/2005 | Fischer et al. | |
| 6,863,448 B2 | 3/2005 | Chiu et al. | |
| 6,873,800 B1 | 3/2005 | Wei et al. | |
| 6,874,953 B2 | 4/2005 | Dair et al. | |
| 6,876,838 B1 | 4/2005 | Daly et al. | |
| 6,883,971 B2 | 4/2005 | Chiu et al. | |
| 6,884,097 B2 | 4/2005 | Ice | |
| 6,885,487 B2 | 4/2005 | Shaw et al. | |
| 6,887,109 B2 | 5/2005 | Hofmeister et al. | |
| 6,890,206 B2 | 5/2005 | Distad et al. | |
| 6,893,167 B1 | 5/2005 | Brostrom et al. | |
| 6,893,293 B2 | 5/2005 | Ice et al. | |
| 6,894,903 B2 | 5/2005 | Sata et al. | |
| 6,901,221 B1 | 5/2005 | Jiang et al. | |
| 6,903,934 B2 | 6/2005 | Lo et al. | |
| 6,908,232 B2 | 6/2005 | McColloch et al. | |
| 6,908,323 B2 | 6/2005 | Ice | |
| 6,912,361 B2 | 6/2005 | Aronson et al. | |
| 6,916,122 B2 | 7/2005 | Branch et al. | |
| 6,916,123 B2 | 7/2005 | Kruger et al. | |
| 2001/0030789 A1 | 10/2001 | Jiang et al. | |
| 2001/0048793 A1 | 12/2001 | Dair et al. | |
| 2002/0028048 A1 | 3/2002 | Dair et al. | |
| 2002/0030872 A1 | 3/2002 | Dair et al. | |
| 2002/0033979 A1 | 3/2002 | Dair et al. | |
| 2002/0094723 A1 | 7/2002 | Festag et al. | |
| 2002/0142634 A1 | 10/2002 | Poplawski et al. | |
| 2002/0149821 A1 | 10/2002 | Aronson et al. | |
| 2003/0020986 A1 | 1/2003 | Pang et al. | |
| 2003/0021552 A1 | 1/2003 | Mitchell | |
| 2003/0059167 A1 | 3/2003 | Chiu et al. | |
| 2003/0063872 A1 | 4/2003 | Govan Date et al. | |
| 2003/0095303 A1 | 5/2003 | Cunningham et al. | |
| 2003/0128411 A1 | 7/2003 | Aronson et al. | |
| 2003/0152331 A1 | 8/2003 | Dair et al. | |
| 2003/0152339 A1 | 8/2003 | Dair et al. | |
| 2003/0169982 A1 | 9/2003 | Amorim | |
| 2003/0169984 A1 | 9/2003 | Chown | |
| 2003/0180006 A1 | 9/2003 | Loh et al. | |
| 2003/0185525 A1 | 10/2003 | Lacy et al. | |
| 2003/0216064 A1 | 11/2003 | Yoshikawa | |
| 2003/0236019 A1 | 12/2003 | Hanley et al. | |
| 2004/0008953 A1 | 1/2004 | Ito et al. | |
| 2004/0008996 A1 | 1/2004 | Aronson et al. | |
| 2004/0022543 A1 | 2/2004 | Hosking et al. | |
| 2004/0022544 A1 | 2/2004 | Case et al. | |
| 2004/0047635 A1 | 3/2004 | Aronson et al. | |
| 2004/0069997 A1 | 4/2004 | Dair et al. | |
| 2004/0071389 A1 | 4/2004 | Hofmeister et al. | |
| 2004/0076113 A1 | 4/2004 | Aronson et al. | |
| 2004/0076119 A1 | 4/2004 | Aronson et al. | |
| 2004/0091005 A1 | 5/2004 | Hofmeister et al. | |
| 2004/0091028 A1 | 5/2004 | Aronson et al. | |

| | | | | | | |
|---|---|---|---|---|---|---|
| 2004/0100687 A1 | 5/2004 | Aronson et al. | | 2004/0208633 A1 | 10/2004 | Akashi et al. |
| 2004/0105679 A1 | 6/2004 | Aronson et al. | | 2004/0226689 A1 | 11/2004 | Thompson et al. |
| 2004/0127102 A1 | 7/2004 | Poplawski et al. | | 2004/0240801 A1 | 12/2004 | Malagrino, Jr. et al. |
| 2004/0136708 A1 | 7/2004 | Woolf et al. | | 2004/0240886 A1 | 12/2004 | Aronson et al. |
| 2004/0136719 A1 | 7/2004 | Hidai et al. | | 2005/0013548 A1 | 1/2005 | Chiu et al. |
| 2004/0136720 A1 | 7/2004 | Mahowald et al. | | 2005/0013559 A1 | 1/2005 | Amorim et al. |
| 2004/0143697 A1 | 7/2004 | Mahowald et al. | | 2005/0031352 A1 | 2/2005 | Light et al. |
| 2004/0144913 A1 | 7/2004 | Fennelly et al. | | 2005/0041933 A1 | 2/2005 | Meadowcroft et al. |
| 2004/0156639 A1 | 8/2004 | Schunk et al. | | 2005/0058406 A1 | 3/2005 | Reilly et al. |
| 2004/0161240 A1 | 8/2004 | Weber | | 2005/0058455 A1 | 3/2005 | Aronson et al. |
| 2004/0161958 A1 | 8/2004 | Togami et al. | | 2005/0063711 A1 | 3/2005 | Rossi et al. |
| 2004/0166734 A1 | 8/2004 | Festag et al. | | 2005/0064743 A1 | 3/2005 | Hofmeister et al. |
| 2004/0175077 A1 | 9/2004 | Weber | | 2005/0100292 A1 | 5/2005 | Malagrino, Jr. |
| 2004/0175172 A1 | 9/2004 | Aronson et al. | | 2005/0105915 A1 | 5/2005 | Light |
| 2004/0196642 A1 | 10/2004 | Aronson et al. | | 2005/0111845 A1 | 5/2005 | Nelson et al. |
| 2004/0197055 A1 | 10/2004 | Fischer et al. | | 2005/0117854 A1 | 6/2005 | Chiu et al. |
| 2004/0197101 A1 | 10/2004 | Sasser et al. | | 2005/0135758 A1 | 6/2005 | Sato et al. |
| 2004/0198079 A1 | 10/2004 | Aronson et al. | | | | |
| 2004/0202476 A1 | 10/2004 | Woolf et al. | | | FOREIGN PATENT DOCUMENTS | |
| 2004/0203443 A1 | 10/2004 | Woolf et al. | | | | |
| 2004/0208460 A1 | 10/2004 | Beer et al. | | TW | 1226469 | 1/2005 |

LIGHT TRANSCEIVER MODULE

RELATED APPLICATION

This application is a Continuation-In-Part of U.S. patent application Ser. No. 10/949,792, filed Sep. 24, 2004 now U.S. Pat. No. 7,300,215, which claimed priority from Taiwanese application No. 093116137, filed Jun. 4, 2004.

BACKGROUND OF THE INVENTION

1. Field of Invention

The invention relates to a light transceiver module and, in particular, to a pluggable light transceiver module.

2. Related Art

In view of the trend in high-speed broadband communications, the optical communication industry that uses light as the communication medium has been making rapid progress. Optic fiber products are thus becoming more important. At the same time, high-speed transmission systems using optic fibers as the transmission media require the support of high-quality light transceiver modules. The light transceiver module is installed in an electronic device to receive/emit optical signals from/to optic fibers.

The light transceiver module mainly contains a base, a light-emitting device, a light-receiving device, and a circuit board. The base supports the light-emitting device, the light-receiving device, and the circuit board. The circuit board has the functions of driving the transmissions and emitting optical signals. In the prior art, the light transceiver module is connected to the electronic device via the pins on the circuit board. The connection between the light transceiver module and the signal source is achieved by connecting the circuit board onto the motherboard in the electronic device via the pins. Therefore, the electronic device can transmit and receive optical signals using the emission and reception terminals of the light transceiver module. In particular, the electronic device has to provide motherboard duct holes for the pins of the circuit board to plug in. However, this type of assembly requires many circuit board pins to align with the motherboard duct holes. If the light transceiver module has to be repeatedly plugged in and out, the pins are likely to be bent or deformed to affect the alignment precision. Consequently, the usual light transceiver modules are not suitable for repeatedly plugging in and out. A pluggable light transceiver module is then invented to circumvent the problem. Nevertheless, since the pluggable light transceiver module integrates the optoelectronic devices required by the receiving and emission terminals into a box, one inevitably faces such problems as heat dissipation, optic fiber connector structure, the alignment between the circuit board pins and the mother board duct holes in another device, electromagnetic (EM) radiation, and electromagnetic interference (EMI). Therefore, it is necessary to make overall improvements in the device configuration and mechanism design so as to simultaneously increase the module efficiency and freedom.

To illustrate the above effect, we look at the Huang et al. (U.S. Pat. No. 6,483,711) is related to Optoelectronic transceiver module with additional grounding which disclosed the subject matters as "The transceiver module comprises a housing, an optoelectronic subassembly, a receptacle, a chassis and a PCB." and, "Conductive leads of the optoelectronic subassembly are soldered to the PCB. The chassis is attached to the PCB with screws, and accommodates and protects the PCB." which can't make overall improvements in the device configuration and mechanism design so as to simultaneously increase the module efficiency and freedom.

To further illustrate the above effect, we look at the Hattori et al. (U.S. Pat. No. 6,855,558) is related to Package with locking mechanism which disclosed the subject matters as "the locking-dislocking mechanism is composed of the operation lever mounted rotatably on the package main body, and the adjusting member which is mounted rotatably to the operation lever and supported slidably by the package main body to adjust the engagement lever, whereby the engagement lever is swingingly moved.", and "the operation lever has a pair of right and left arms and which are placed on the opposite sides of the front of the package main body, respectively, wherein the shafts and are mounted to the respective arms and so as to be in parallel to each other. In this condition, the operation lever is adapted to be pivoted in a tiltable manner along a direction in removing the package main body by means of either of the shafts which can't make overall improvements in the device configuration and mechanism design so as to simultaneously increase the module efficiency and freedom.

SUMMARY OF THE INVENTION

In view of the foregoing, the invention provides a light transceiver module with a pluggable design to avoid the pin alignment problem. The disclosed light transceiver module can achieve the goal of easy dismounting for examinations.

The disclosed light transceiver module is installed in an electronic device, forming an electric connection for signal transmissions via the electronic connector of the electronic device. The light transceiver module contains a base, a light-emitting device for providing optical signals, a light-receiving device for receiving optical signals, and a main circuit board. The base is used to support the light-emitting device, the light-receiving device, and the main circuit board. The light-emitting device and the light-receiving device are electrically connected to the main circuit board. The main circuit board has a pluggable electric connector for the main circuit board to be plugged along a single direction to the electronic connector of the electronic device. With a lever design, the plugging and unplugging of the light transceiver module can be simplified. One can further reduce the use of screws using special assembly and connection designs, facilitating the production and examination of the light transceiver module. For example, a top cover for protection can be mounted on the base via a spring chip. The base can be provided with device bases that are easy to replace for mounting the light-emitting device and the light-receiving device. In this case, one only needs to replace the device bases for the connections of different optic fiber connectors without changing the whole light transceiver module structure. Moreover, the invention can contain several soft circuit boards or metal pins for the main circuit board to be electrically connected to the light-emitting device and the light-receiving device. One may also use a hollow cylindrical shell to enclose the light-emitting device, the light-receiving device, the main circuit board, and the base.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
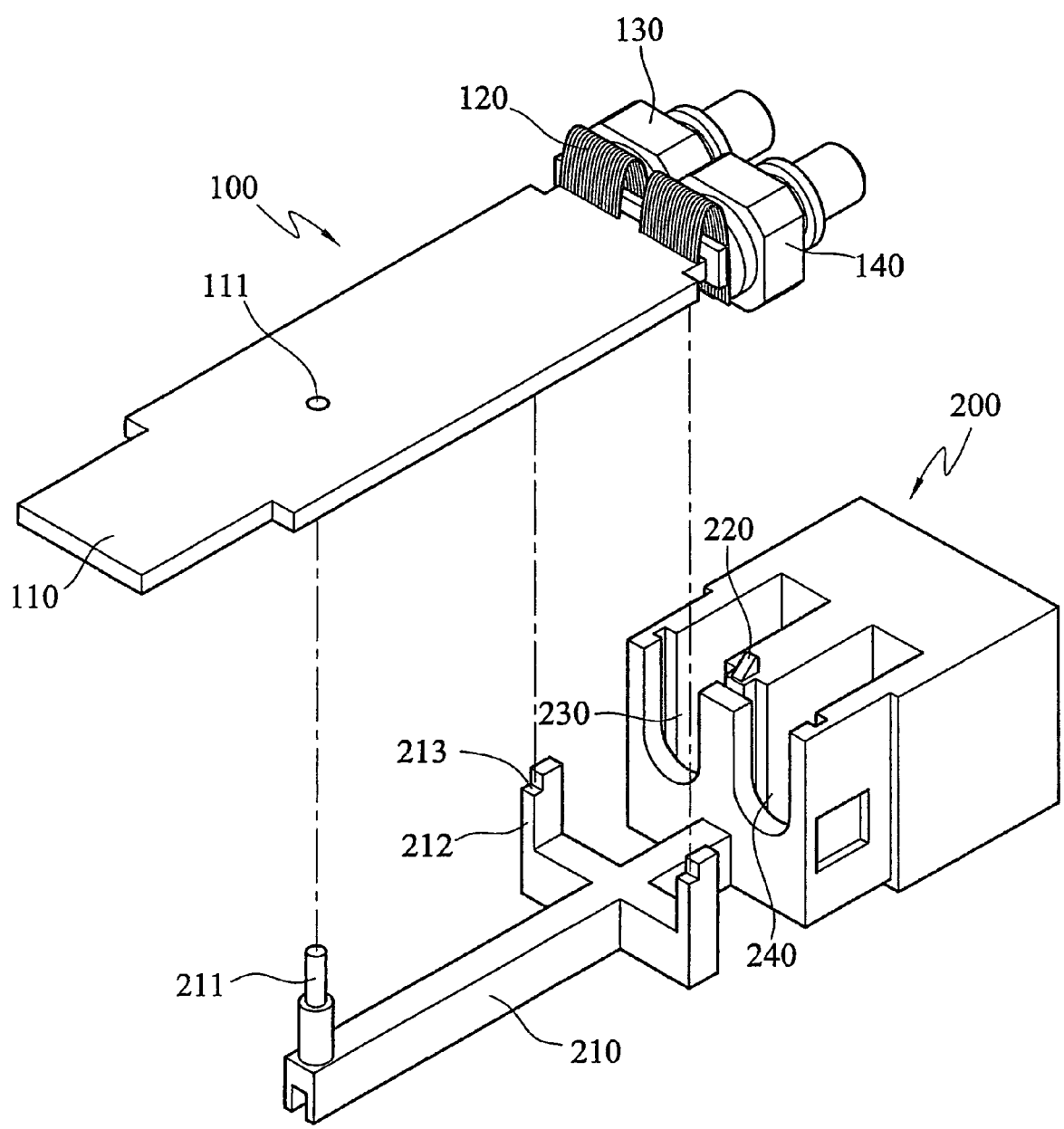
FIG. 1 is a schematic view of the structure in a first embodiment of the invention.

As shown in FIG. 1, the disclosed light transceiver module is installed on an electronic device (not shown). The electronic device provides an electric connector. The light transceiver module contains a base 200, a light-emitting device 130, a light-receiving device 140, a main circuit board 100, and two soft circuit boards 120. The base 200 supports the base 200, the light-emitting device 130, the light-receiving device 140, and the main circuit board 100. The two soft circuit boards 120 are the connection interfaces between the light-emitting device 130, the light-receiving device 140 and the main circuit board 100, respectively. The main circuit board 100 contains a pluggable electronic connector 110. In this embodiment, the pluggable electronic connector 110 uses the mating commonly used in the print circuit board (PCB). It is plugged into the corresponding electric connector of the electronic device.

The light-emitting device 130 and the light-receiving device 140 are first connected to the main circuit board 100 via the soft circuit boards 120, then assembled to the base 200. The base 200 contains two fixing positions 230, 240 for the installation of the light-emitting device 130 and the light-receiving device 140. The base 200 adopts a cross beam design. That is, after the light-emitting device 130 and the light-receiving device 140 are installed, the place on the base 200 for installing the main circuit board 100 is provided with a cross beam 210 with the central beam and transverse beams being solid but the rest being hollow. Therefore, the main circuit board 100 exposes most of its area without blocking the electronic devices thereon and their connection points. This is very convenient in debugging, examination, or adjustments. The central beam 210 has a protruding part 211 at its end. Correspondingly, the main circuit board has a hole 111 for the insertion of the protruding part 211. On both sides of the transverse beam, there are protruding parts 212 with concave parts 213 on the tops. The concave parts 213 are designed to hold both sides of the top of the main circuit board 100. The bottom of the base 200 has a mounting mechanism (not shown) for installing the light transceiver module on the electronic device.

In practice, the disclosed light transceiver module is preferably to be provided with a protection shell to avoid damages due to frequent plugging and unplugging. Moreover, the shell is preferably provided with a lever design to facilitate the mounting and dismounting of the light transceiver module.

Figure 2A:
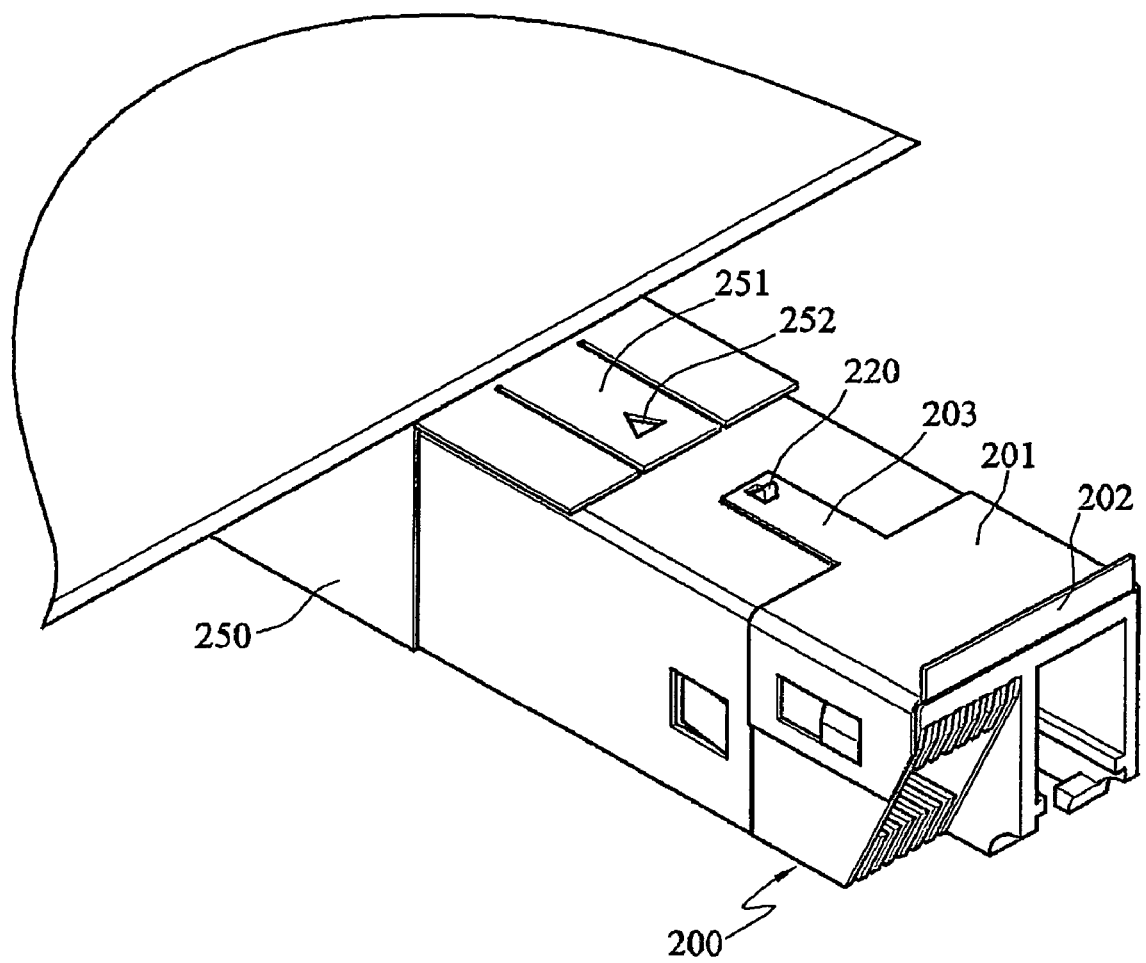
FIG. 2A is a schematic view of the structure in a second embodiment of the invention.
Figure 2B:
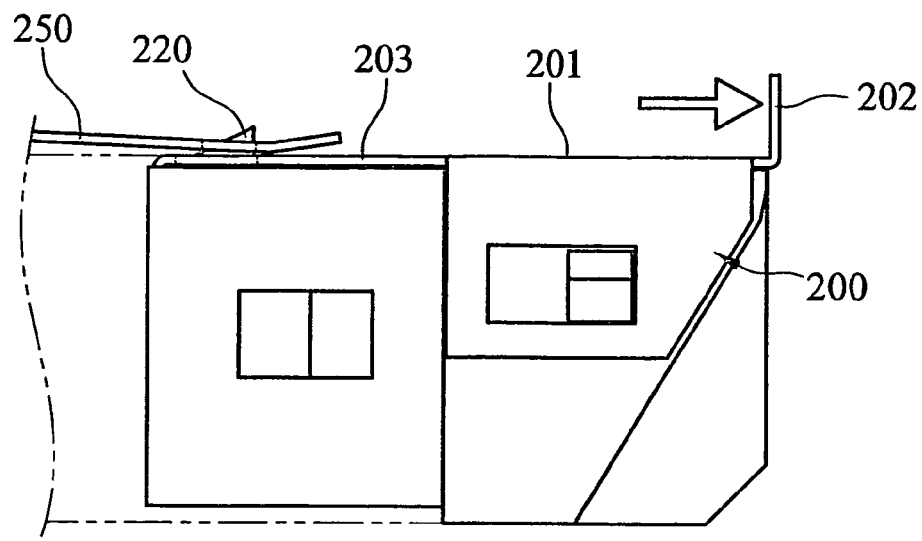
FIG. 2B is a schematic view of the second embodiment installed on an electronic device.
Figure 2C:
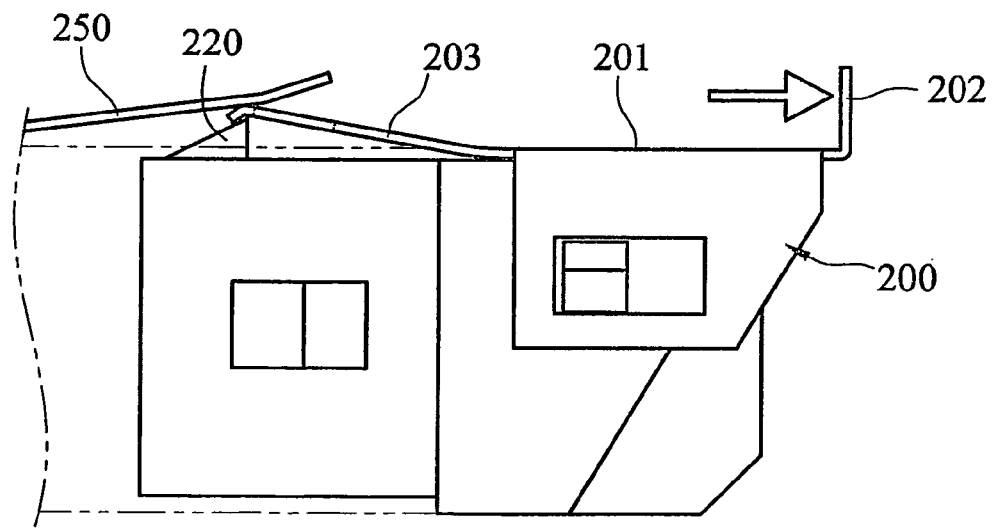
FIG. 2C is a schematic view of the second embodiment departing from the electronic device.

With reference to FIG. 2A, the design of a pulling plate facilitates the plugging and unplugging of the light transceiver module. The bottom of the base is installed with a pulling plate 201. The pulling plate 201 extends to form a holding part 202 and a tail chip 203 with a hole. The bottom of the base 200 is also provided with a protruding part 220 as a connecting element to the hole of the tail chip 203. A suspension plate 251 with an opening 252 is provided on the electronic device 250 at a position corresponding to the protruding part 220 of the base 200. When installing the light transceiver module to the electronic device 250, as shown in FIG. 2A and FIG. 2B, the opening 252 of the suspension plate 251 locked the protruding part 220. When unplugging the light transceiver module, as shown in FIG. 2C, the user holds the holding part 202 of the pulling plate 201 and exerts a force in the direction opposite to plugging the main circuit board into the electronic device. When the pulling plate 201 is pulled out, the tail chip 203 on the pulling plate 201 climbs up the protruding part 220 and pushes away the suspension plate 251 and the electronic device 250 meanwhile. The light transceiver module is thus unplugged from the electronic device 250.

Figure 3:
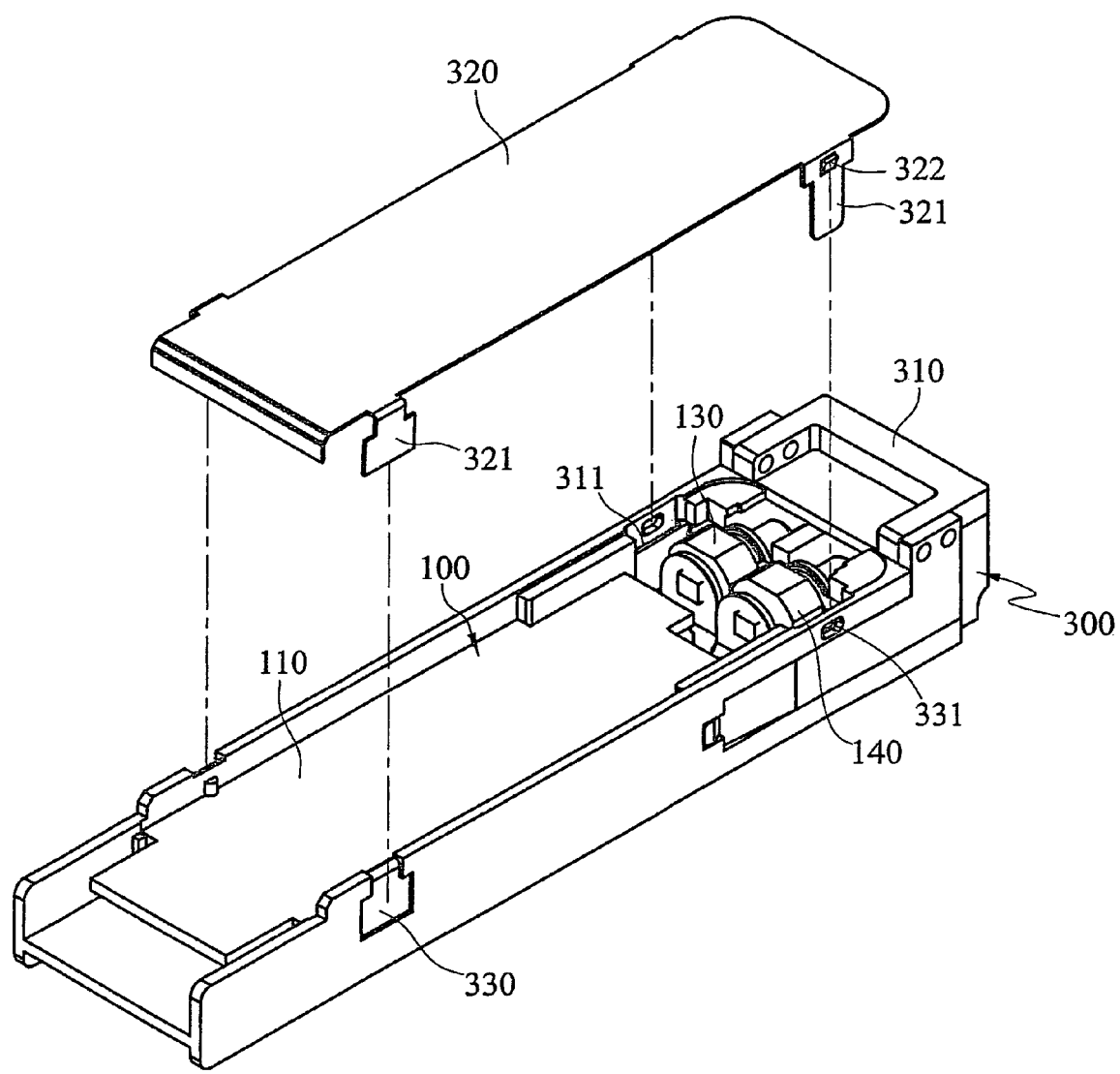
FIG. 3 is a schematic view of the structure in a third embodiment of the invention.

A third embodiment with a lever design of the invention is shown in FIG. 3. The light-emitting device 130 and the light-receiving device 140 are first combined with the main circuit board 100 via the soft circuit boards 120, and then installed on the base 300. The base 300 provides concave parts for mounting the light-emitting device 130, the light-receiving device 140, and the main circuit board 100. The base 130 has a lever 310 for the convenience of unplugging the light transceiver module. It provides a mechanism for exerting a force in the direction opposite to plugging the pluggable electronic connector 110 of the main circuit board 100 into the electronic device. This greatly simplifies the steps of releasing the light transceiver module. In the prior art, two steps are required for the light transceiver module to have both transverse and longitudinal displacements in order to release the light transceiver module. The design of the lever 310 along with other combination elements (not shown) fixes the light transceiver module on the electronic device. The light transceiver module can be easily released from the electronic device by using the lever 310 to provide a transverse displacement.

In a third embodiment of the invention, a top cover 320 is provided to protect the above-mentioned elements. Since the top cover 320 is fixed, it does not depart from the light transceiver module as the light transceiver module is plugged or unplugged. As shown in the drawing, the top cover 320 contains several chips 321. The base 300 are formed with several corresponding holes 330 for the chips 321. Each of the chips 321 can be formed with a hook 322, and the corresponding position on the base 300 is formed with a hook hole 331 for the hook 322. The chips 321 on the top cover 320 are simultaneously plugged into the long holes 311 of the lever 310, thereby limiting the pulling distance of the lever 310 and preventing it from being removed. Therefore, the top cover 320 does not require screws and can be used to limit the motion of the lever.

Figure 4:
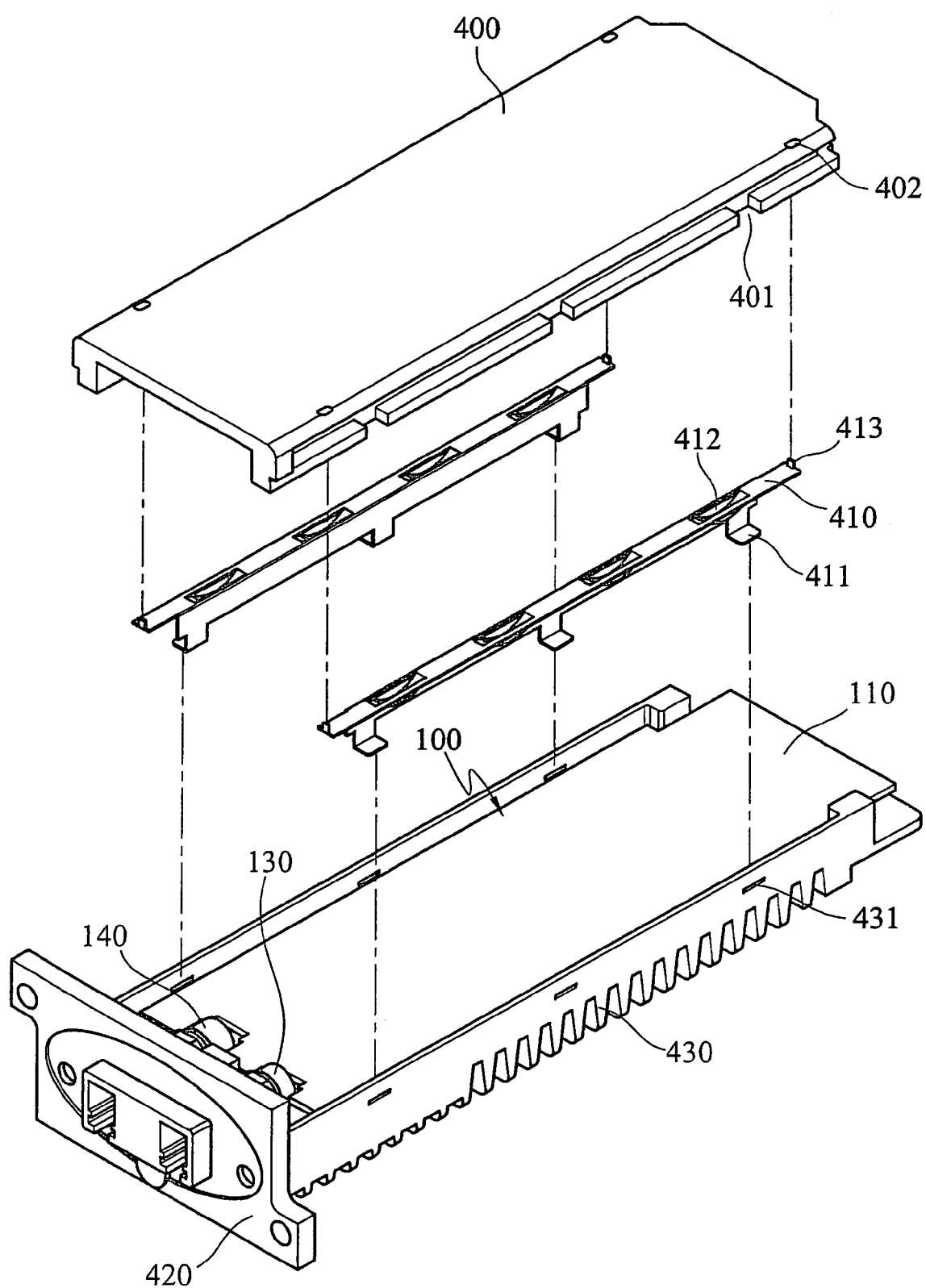
FIG. 4 is a schematic view of the structure in a fourth embodiment of the invention.

The module is design to use as few screws as possible for the convenience of the assembly and production of the light transceiver module. Moreover, one only needs to change the fixing bases to satisfy the requirements of different optic fiber connectors. With reference to FIG. 4, the fourth embodiment of the invention combines the light-emitting device 130, the light-receiving device 140, and the main circuit board 100 using soft circuit boards (not shown). Afterwards, they are assembled onto the base 430, which is provided with fixing bases 420 to fix the light-emitting device 130 and the light-receiving device 140. The light transceiver module further contains a protection top cover 400 and combination chips 410. The combination chips 410 are provided on both sides of the top cover 400 to combine with the base 430. Both ends of each combination chip 410 have protruding parts 413, and the corresponding positions on the top cover are formed with socket holes 402 for the insertion of the protruding parts 413. The combination chip 410 further has several hooks 411, and the corresponding positions on the base are formed with openings 431. The hooks 411 and the openings 431 are used to combine the top cover 400 and the base 430. This design avoids the use of screws and simplifies the module assembly. The positions on the top cover 400 corresponding to the hooks 411 are formed with concave parts 401 in order to accommodate the hooks 411 after the combination. In the third embodiment, the fixing bases are mobile relative the base. They can be replaced for different optic fiber connectors without modifying the whole module structure. As shown in the drawing, the combination chip may contain several elastic elements 412 that are exposed out of the base 430 after the combination. They provide the necessary buffer and fixture when the light transceiver module is plugged or unplugged.

Figure 5A:
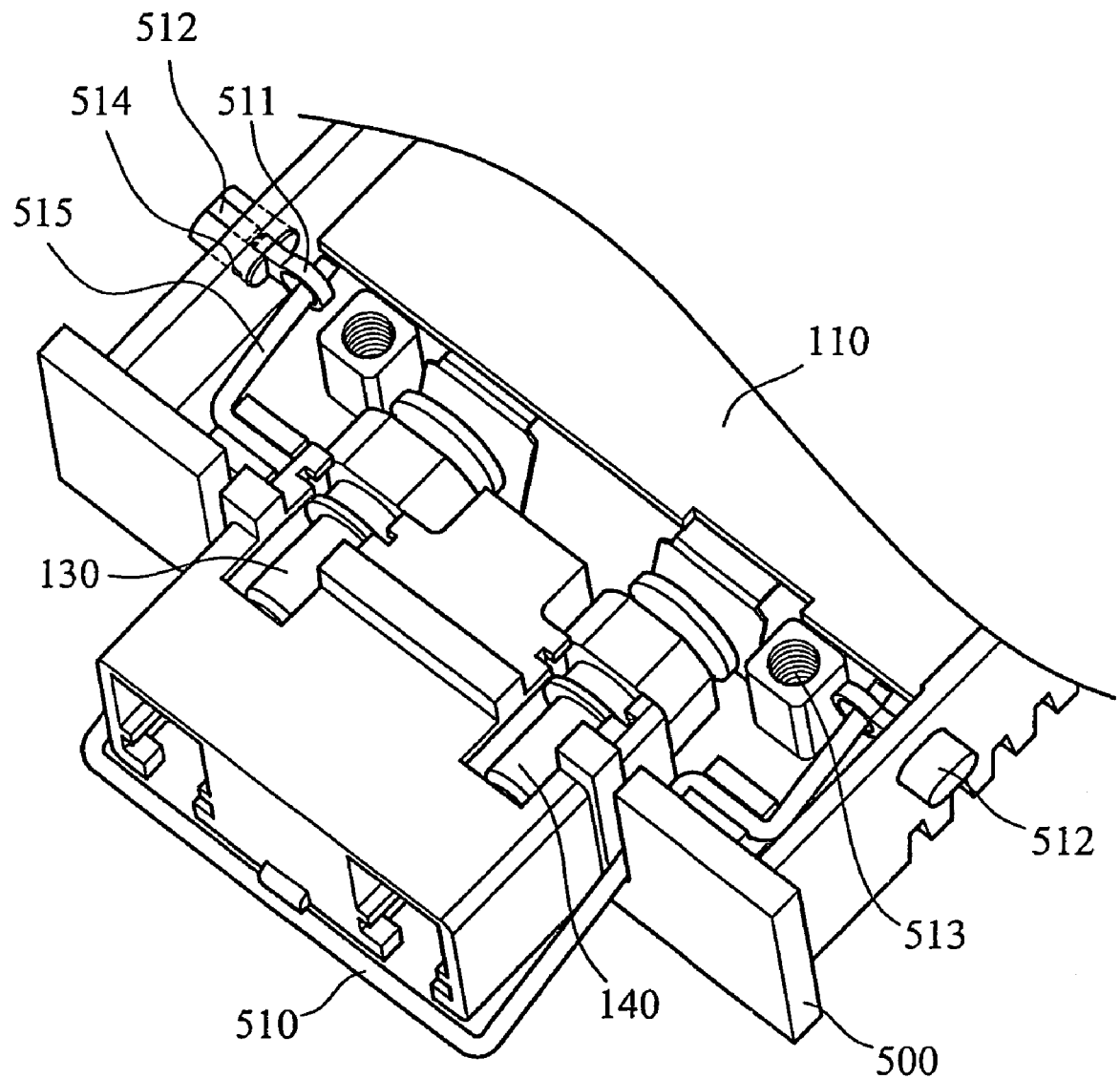
FIGS. 5A to 5D are schematic views of the structure in a fifth embodiment of the invention.
Figure 5B:
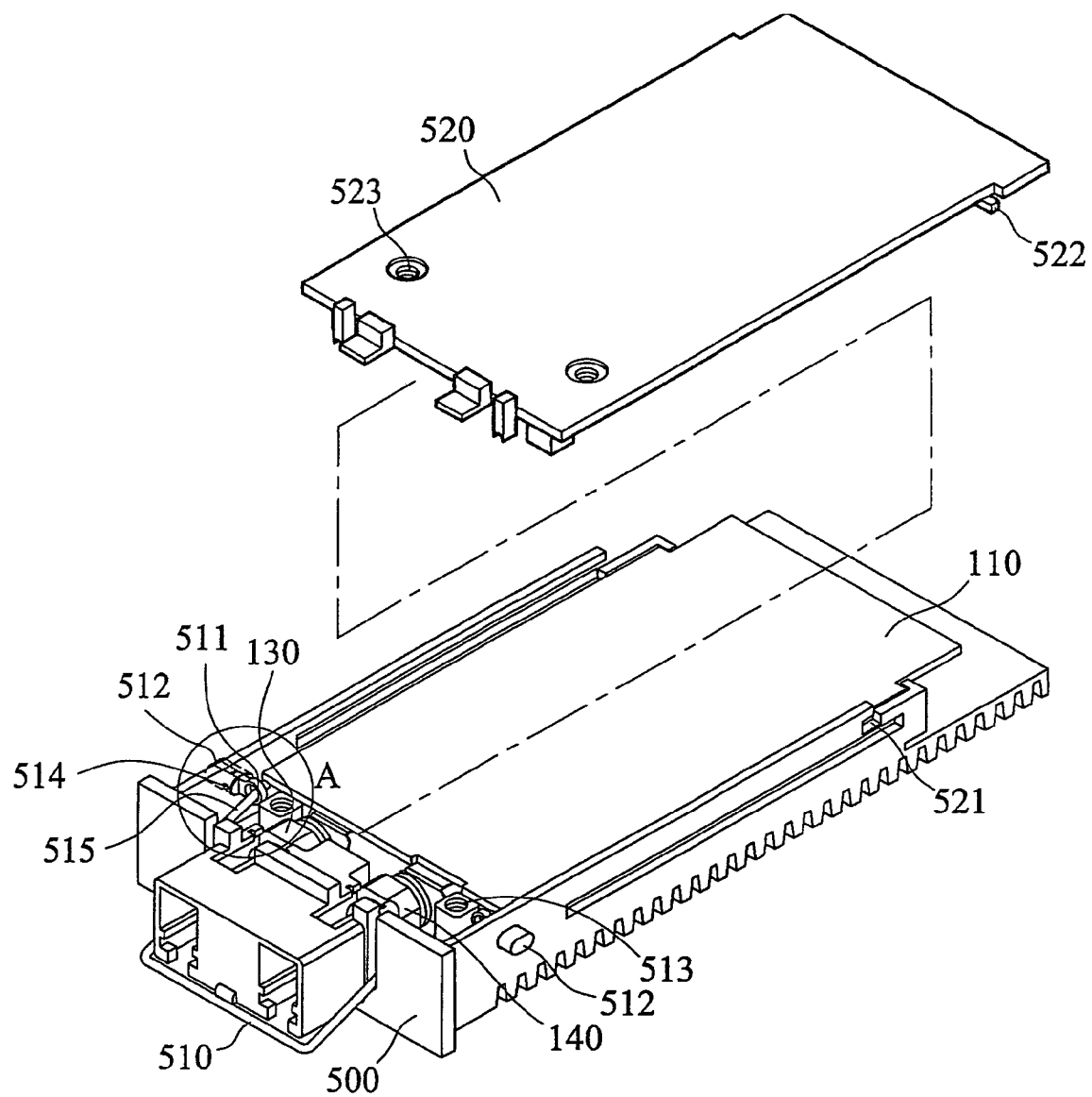
Figure 5C:
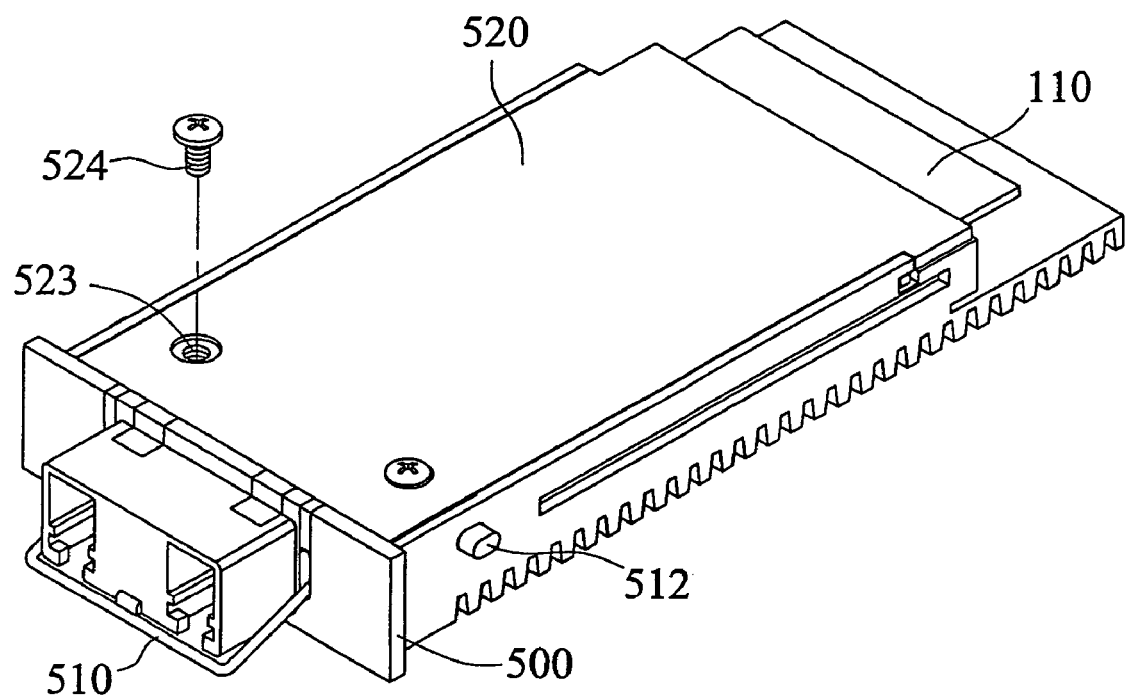
Figure 5D:
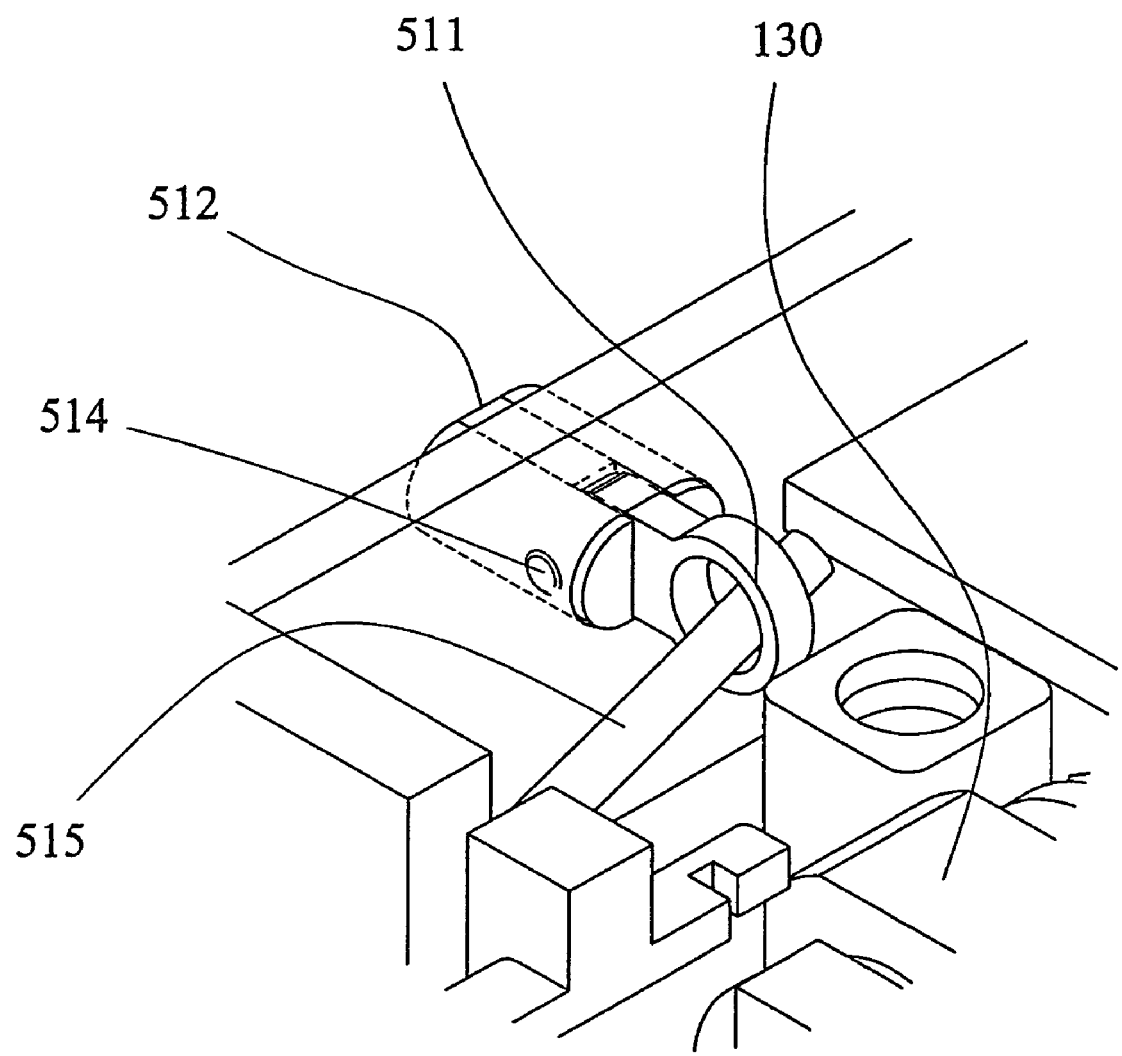

The disclosed lever can have actions in other forms according to the module structure. A fifth embodiment of the invention is depicted in FIGS. 5A to 5C. As shown in FIG. 5A, the light-emitting device 130, the light-receiving device 140, and the main circuit board 100 are combined using soft circuit board (not shown) and then assembled onto the base 500. The base 500 has a longitudinal crack to accommodate the lever 510 and for the lever 510 to move along the crack. Each side of the base 500 is provided with a hook ring 511 and a post 512 that holds the hook ring 511. The hook ring 511 and the post 512 connect each other made use of a shaft 514. By way of the connection of the shaft 514, the hook ring 511 are allowed to rotate about the shaft 514 as an axis. Thereby, the hook ring 511 get movable with respect to the post 512. One protruding end 515 of the lever 510 extends into the hook ring 511. As the lever 510 moves up and downs along the longitudinal crack, so moves the protruding end 515 of the lever 510, eventually the hook ring 511 is driven to make the post 512 move in and out of the base 500. When the post 512 moves in, the module and the base 500 become separate. When the post 512 moves out, the module can be fixed with some other mechanism. As shown in FIG. 5B, the fifth embodiment can be provided with a top cover 520. The top cover 520 has a protruding part 522 and a through hole 523. The corresponding positions on the base 500 are formed with a crack 521 and a screw hole, respectively. As shown in FIG. 5C, the through hole 523 and the protruding part 522 on the top cover 520 are aligned with the screw hole 513 and the crack 521 of the base 500, respectively. A screw 524 is then used to go through the through hole 523 and the screw hole 513. As shown in FIG. 5D, the enlargement view of area A of FIG. 5B is pictured in which area describes the hook ring 511 and the post 512 connecting each other by making use of a shaft 514. By way of the connection of the shaft 514, the hook ring 511 are allowed to rotate about the shaft 514 as an axis.

Certain variations would be apparent to those skilled in the art, which variations are considered within the spirit and scope of the claimed invention.

What is claimed is:

1. A light transceiver module installed in an electronic device having a suspension plate with a hole, forming an electric connection with an electric connector of the electronic device, the light transceiver module comprising:
    a light-emitting device, which provides an optical signal;
    a light-receiving device, which receives an optical signal;
    a main circuit board, which connects the light-emitting device and the light-receiving device so that the light-emitting device and the light-receiving device are in electrical communications with the main circuit board, and contains a pluggable electric connector for the main circuit board to insert into and form electrical communications with the electric connector of the electronic device;
    a base, which supports the light-emitting device, the light-receiving device, and the main circuit board, the base having a longitudinal crack;
    a cross beam on the base for installation of the main circuit board, wherein the cross beam has a central beam and transverse beam being solid; and
    a lever on the base, the longitudinal crack of the base accommodating the lever and for the lever to move alone the crack.

2. The light transceiver module of claim 1 further comprising a fixing base removeably connected to the base for accommodating different types of optical fiber.

3. The light transceiver module of claim 1, wherein the bottom of the module further comprises a combination mechanism for fixing the module on the electronic device.

4. The light transceiver module of claim 1, wherein the base comprises a protruding part such that the protruding part catch the opening formed on the electronic device and fix the base on the electronic device when the pluggable electric connector is plugged in and forms electrical communications with the electric connector of the electronic device.

5. The light transceiver module of claim 4 further comprising a pulling plate installed on the base, wherein the pulling plate comprises a tail chip with a hole for the protruding part of the base to go through.

6. The light transceiver module of claim 1, wherein the pluggable electric connector is a mating portion of main circuit board.

7. The light transceiver module of claim 1 further comprising a soft circuit board connected to the main circuit board so that the main circuit is in electrical communications with the light-emitting device and the light-receiving device.

8. The light transceiver module of claim 1, wherein both sides of the transverse beam have protruding parts with concave parts on the top, and the concave parts hold both sides of the top of the main circuit board.

9. The light transceiver module of claim 1, wherein the base is provided with a hook ring and a post connected to the hook ring, the hook ring and the post connect each other made use of a shaft, by way of the connection through the shaft, the hook ring are allowed to rotate about the shaft as an axis, thereby, the hook ring gets movable with respect to the post, a protruding end of the lever penetrates through the hook ring so that when the lever moves up and downs along the longitudinal crack, the hook ring is driven to move the post in and out of the base.

10. The light transceiver module of claim 1 further comprising a top cover installed on the base to cover the light-emitting device, the light-receiving device, and the main circuit board.

11. The light transceiver module of claim 10, wherein the top cover contains a plurality of protruding parts and the corresponding positions on the base are formed with a plurality of cracks to accommodate the protruding parts.

12. The light transceiver module of claim 10, wherein the top cover contains a plurality of chips and the corresponding positions on the base are formed with a plurality of concave parts to accommodate the chips.

13. The light transceiver module of claim 12, wherein at least one of the chips has a hook and the corresponding position on the base is formed with a hook hole for the hook to catch.

14. The light transceiver module of claim 12, wherein the lever has long holes for accommodating the chips so that the chips limiting the pulling distance of the lever and preventing the lever from being removed.

15. The light transceiver module of claim 10, wherein the top cover is fixed on the base by locking.

16. The light transceiver module of claim 10 further comprising a combination chip to combine the sides of the top cover and the base.

17. The light transceiver module of claim 16, wherein each end of the combination chip is formed with a protruding part and the corresponding position on the top cover is formed with a socket hole for the insertion of the protruding part, and the combination chip has a plurality of hooks and the corresponding positions on the base are formed with a plurality of openings for accommodating the hooks.

18. The light transceiver module of claim 16, wherein the combination chip contains a plurality of elastic elements exposed out of the base.

* * * * *